Figure 1:
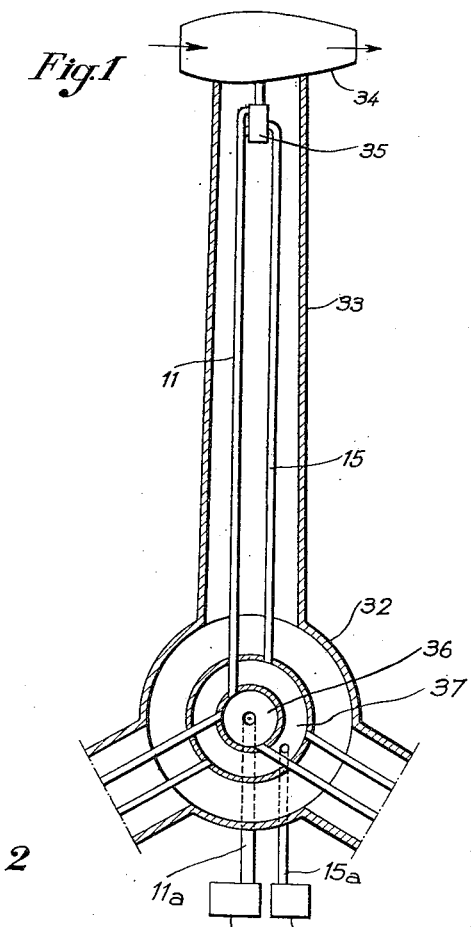

April 29, 1952   P. MORAIN   2,594,788
FUEL FEEDING OF ENGINES ARRANGED AT THE
ENDS OF THE BLADES OF A ROTARY WING
Filed July 19, 1949   3 Sheets-Sheet 1

Paul Morain
By Fraser, Myers & Manley
Att'ys.

April 29, 1952     P. MORAIN     2,594,788
FUEL FEEDING OF ENGINES ARRANGED AT THE
ENDS OF THE BLADES OF A ROTARY WING
Filed July 19, 1949                        3 Sheets-Sheet 2

Paul Morain
By Fraser, Myers & Manley
Att'ys.

UNITED STATES PATENT OFFICE 2,594,788

FUEL FEEDING OF ENGINES ARRANGED AT THE ENDS OF THE BLADES OF A ROTARY WING

Paul Morain, Paris, France, assignor to Societe Nationale de Constructions Aeronautiques du Sud-Ouest (Societe Anonyme), Paris, France, a company of France Application July 19, 1949, Serial No. 105,496
In France August 17, 1948

10 Claims. (Cl. 60—39.35)

Engines are conveniently arranged at the ends of rotary-wing blades, especially of helicopter rotor blades, as such an arrangement does not give rise to a mechanical torque on the hub of the rotor and hence there is no need to make up for this torque.

However, one of the difficulties encountered with such an arrangement, lies in the control at every moment of the exact mixture-ratio of fuel and air which cross the hub through a rotating seal and are led to the engines along the blades.

It may be conceived to effect the fuel flow control up-stream with respect to the hub, the latter distributing equally the flows feeding each engine. But the centrifugal force gives rise, in the piping on the level with the engines, to an important overpressure $\Delta p$ of the fuel relatively to the pressure existing in the hub. The flow at the fuel feed nozzles (carburetor jets, combustion chamber injectors) being proportional to the square root of the pressure, it is necessary to lead the fuel to the hub by exerting a very large pressure $p_0$, so that the total variation in the flow (which is a function of $$\sqrt{p_0 + \Delta p}$$

meets, when $p_0$ varies, the conditions for regulating the power of the engine. Nevertheless, $\Delta p$ being proportional to the square of the angular velocity of the rotor, the power of the engine is responsive, for a given value of $p_0$, to the variation in angular velocity, in a way unfavorable to the stability of the rate.

A way to meet this drawback is to proportion by means of a nozzle on the level with the hub, the mixture-ratio of the fuel sent into each blade, but at a low pressure. The fuel is then subjected to the centrifugal force and, in case the fuel is liquid, a liquid column is set up in each blade, with a free surface, at a certain distance from the hub. The pipes feeding the engine are branched off this liquid column so that a state of equilibrium is reached such that, under the centrifugal force corresponding to this height, the engine nozzle delivers the same amount of fuel as that delivered by the hub nozzle.

Another drawback is then encountered: an appreciable delay between the moment the flow is altered at the hub and the moment the flow varies at the engine nozzle. This delay is caused by the lapse required for the change in height of the fuel urged by the centrifugal force and depending mainly on the flow of fuel and on the volume of the pipes. This delay is very troublesome as regards the accuracy of the pilot's controls and in particular, it does not allow an automatic rate regulator to be adapted.

The only satisfactory regulating system is a simultaneous remote control of feed-valves located as near the engines as possible. For this purpose, mechanical or electrical systems may be devised, but it is difficult to adapt them owing to the necessity of crossing the hub and to the hindrances due to centrifugal force.

The present invention relates to a device avoiding the above-mentioned drawbacks. The invention has for its object a device for feeding with fuel an engine arranged at the end of a blade of a rotary wing characterized in that it comprises a feed-valve controlled by means of a member made of a chamber divided into two enclosures by a tight partition liable to be displaced or distorted by a differential pressure in said enclosures against the action of a return force, said partition being connected to said feed-valve in such a way that the movement of said partition governs the lift of said feed-valve, said feed-valve being connected to a feed-pipe which is further connected to one of said enclosures, the other enclosure being connected to another pipe.

The effect of the pressure due to the centrifugal force exerted on the liquid of both pipes, is balanced and thus cancelled. Moreover the tight partition, together or not with the centrifugal force exerted on the feed-valve itself, entails a predetermined relation between the differential control pressure of the two pipes and the lift of this valve. It is convenient to use as control liquid, the liquid fuel itself and to ensure, through one of these pipes, the supply of fuel to the controlled valve and hence to the propeller. In this case, the other pipe, also full of fuel, is only used for the control of the differential pressure exerted on the movable member. Thus one pipe is done without and the tightness devices required by connection of the tight partition and the feed-valve, are much simplified.

For manufacturing convenience this valve comprises an axially movable needle, whereas the tight partition dividing the chamber is a distortable membrane or diaphragm perpendicular to the axis of the needle and linked to it. The needle together with the membrane are urged by a return spring preferably acting in the direction of the closing or said needle. According to the design of the device it is possible to obtain a given lift of the needle by creating either an overpressure or a depression in the control pipe relatively to the feed-pipe.

When an overpressure is resorted to, the control pipe is fed through a pump whose discharge pressure may be varied, this pump being branched on the delivery of the feed-pump.

When a depression is resorted to, the control pipe is fed through a tapping of the delivery of the feed-pump and the differential pressure is obtained by creating a varying duct-loss.

With such devices, the pipes in the hub and the blades are always full of liquid. Besides the two pipes required for each blade, the device according to the invention obviously requires two rotating seals on the hub.

Other objects and advantages of the invention will be apparent during the course of the following description.

Figure 2:
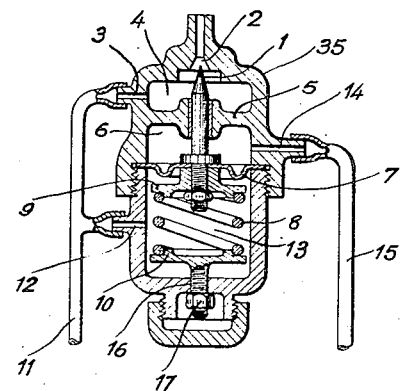
Figure 3:
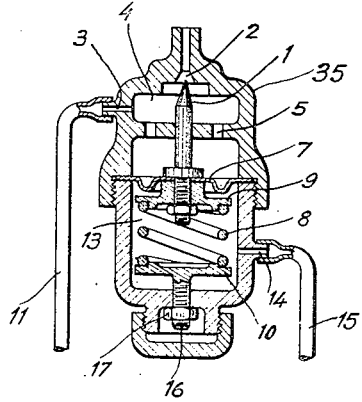
Figure 4:
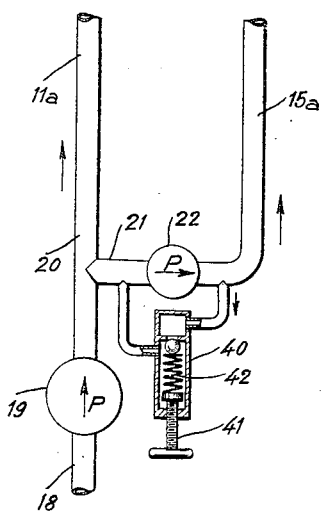
Figure 5:
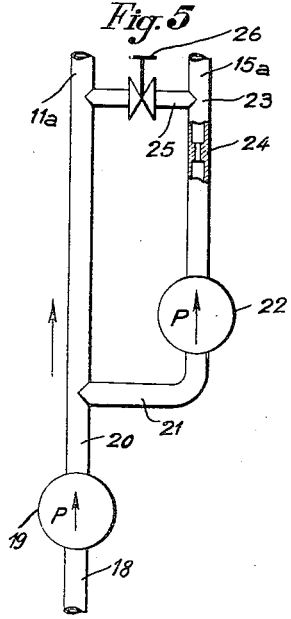
Figure 6:
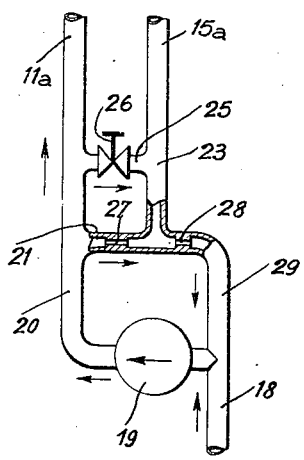
Figure 7:
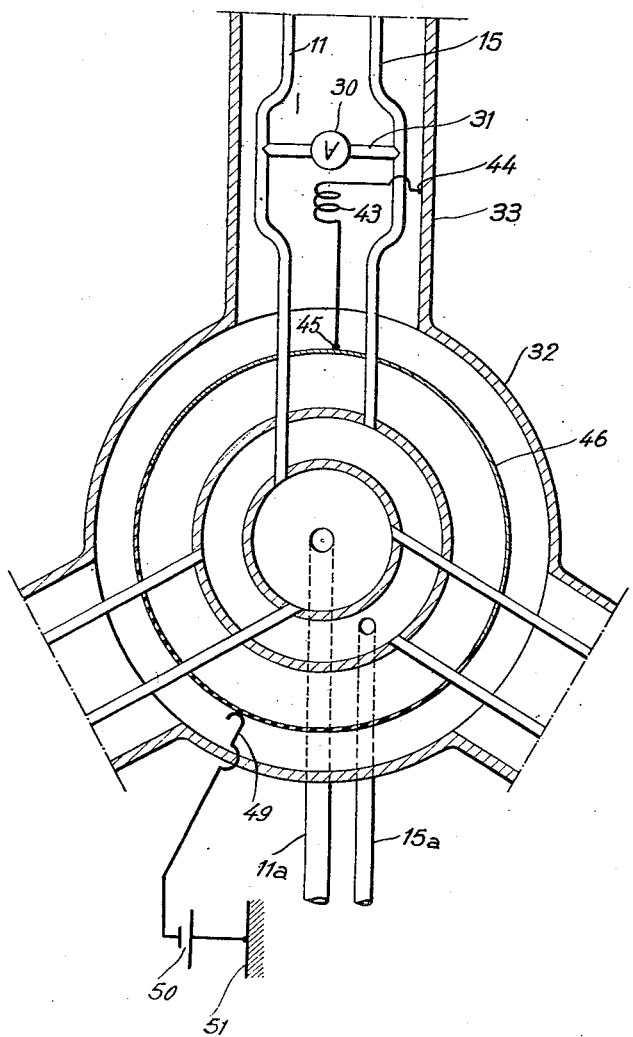

In the accompanying drawing forming a part of this application and in which like numerals are employed to designate like parts throughout the same, Fig. 1 is a fragmentary diagrammatic section of a rotor according to the invention, Fig. 2 is an axial section of a feed-device operated by overpressure, Fig. 3 is an axial section of a similar device operated by depression, Figs. 4 and 5 are diagrams of a hydraulic circuit in the case of operation by overpressure, Fig. 6 is a diagram of a hydraulic circuit in the case of operation by depression, and Fig. 7 is a diagrammatic section of a rotor hub including a cyclic control of the feeding device.

In Fig. 1, a freely rotatable hub 32 carries arms 33 at the end of which jet motors 34 are provided. Each of said motors is fed with liquid fuel through a feed device 35 connected to the hub through radial parallel pipes 11 and 15 preferably enclosed in the arms 33. Pipes 11 and 15 are respectively connected to the feed pipes 11a and 15a through rotary seals 36 and 37, respectively, of known type, which may be arranged in known manner with means for recovering fuel having leaked and returning it to the fuel tank.

Pipes 11a and 15a are respectively supplied with fuel under pressure by appropriate devices 38 and 39, examples of which are illustrated more clearly in Figs. 4, 5 and 6. The devices are adapted to supply different pressures to pipes 11a and 15a.

When the hub rotates, the liquid fuel located inside the pipes 11 and 15 is subjected to centrifugal action which obviously alters the pressure prevailing at the ends of said pipes remote from the center. However, this centrifugal action being equivalent in both pipes, the pressure difference due to devices 38 and 39 remains unaltered throughout the pipes. As a result, the feed device 35 located at the remote ends of said pipes and responsive merely to the pressure difference of the liquid fuels, will not be affected by variations in centrifugal actions, that is, in R. P. M. Feed devices of this type are illustrated in Figs. 2 and 3.

In Fig. 2, a needle valve 1 whose seating is 2, is secured to the center of an elastic diaphragm 7 dividing a chamber into two enclosures 6 and 13. A partition 5 isolates an enclosure 4 crossed by the needle valve 1, this partition has an accurately adjusted and practically tight guiding for the needle valve. The liquids within the enclosures 4 and 6 being the same, the provision of a special joint of the stuffing-box type is not required and leakages of control liquid or of fuel cannot occur. The enclosure 4 is fed through a duct 3 by pipe 11 named hereafter "fuel feed-pipe" and which is also connected, through a duct 12, to the enclosure 13. The enclosure 6 is connected, through a duct 14, to the pipe 15 named "control pipe." A spring 8 compressed between a flange 9 fast with the needle and a flange 10 provided with an adjusting device consisting of a screw 16 and a nut 17, urges the needle into its seating. The device is so directed that the needle axis lies along the line of action of the centrifugal force; the needle, the diaphragm, the flange 9 and the spring 8 are as light as possible.

When the pipes 11 and 15 are at the same pressure, viz., the discharge pressure of the feed-pump increased by the centrifugal pressure on both liquid columns (the same for each of them), the centrifugal force on the movable members of the needle and the strength of the spring urge the needle into its seating. There is then no flow of fuel.

When a sufficient overpressure is generated in the pipe 15 relatively to the pipe 11, this overpressure entails, through elastic distortion of the diaphragm 7, an increase in the volume of 6 relatively to the volume of 13, the spring 8 being compressed until a new state of equilibrium is reached. The needle is lifted by a certain amount depending on the magnitude of the overpressure, on the size and weight of the diaphragm and of the moving parts, and on the elasticity of the diaphragm and of the spring. For a given angular velocity of the rotor, the centrifugal force is constant, and the flow of fuel depends only on the overpressure in the control pipe. If the angular velocity varies a little—the limits of variation are slight in the case of a helicopter rotor—the mass of the moving parts being small, the above conclusions remain accurate enough.

Fig. 3 shows a needle device controlled by relative depression, the various members operating in a way similar to those of Fig. 2 and having the same reference numbers. But in this case, there are practically only two enclosures 4 and 13 to which the feed-pipe 11 and the control pipe 15 respectively lead through ducts 3 and 14. These two enclosures are separated by the diaphragm 7 secured to the needle valve 1. The partition 5 is perforated and the guiding of the needle need no longer be tight. The operation is the same as above when a depression in pipe 15 relatively to pipe 11 is created, i. e. a depression in enclosure 13 relatively to enclosure 4.

Figs. 4, 5, 6 diagrammatically show feeding arrangement of the pipes 11a and 15a allowing a control of the fuel pressure difference in said pipes.

The arrangement shown in Figs. 4 and 5 provides an over pressure in pipe 15a with respect to pipe 11a, while the arrangement shown in Fig. 6 provides a depression in pipe 15a with respect to pipe 11a. The former arrangement is convenient for the feed device shown in Fig. 2 while the latter matches with the feed device of Fig. 3.

In Fig. 4, 18 is a pipe supplied by the tank, 19 is the feed-pump, 20 the delivery pipe of this pump, directly connected to pipe 11a and a branch of which, tapped at 21, leads to the variable overpressure control pump 22 discharging into the control pipe 15a. The pump 22 may be of classical type comprising, between its inlet and its outlet, a controllable pressure relief valve 40 limiting the difference in pressure between the input and the output. By adjusting this valve by means of the screwed handle 41 urged by the spring 42, the magnitude of the overpressure is thus controlled, and hence the lift of the needle. Obviously the valve 40 may be arranged between the outlet of the pump 22 and the fuel tank.

Fig. 5 shows another arrangement according to which pump 22 is such that it ensures a constant difference in pressure between its input and output. This pump sucks in through pipe 21 which is branched off the discharge of feed-pump 19. At its outlet, the total pressure is therefore $p_0+d_{p1}$, $p_0$ being the pressure supplied by pump 19 and $d_{p1}$ the constant overpressure of pump 22. The latter discharges through a calibrated duct 24 into the control pipe 15a tapped at 23 with a by-pass pipe 25 provided with a valve 26. The pressure in 23 is $p_0+d_{p1}-d_{p2}$, $d_{p2}$ being the duct-loss whose magnitude depends both on the flow through the calibrated duct 24 and through the by-pass 25, this latter flow being adjusted by means of the control valve 26. Hence, by operating this valve, the overpressure $d_{p1}-d_{p2}$ of the control pipe 15a relatively to the feed-pipe 11a is adjusted at will. It is noted, in the case of the control by overpressure, that the lift of the needle only depends on the magnitude of the overpressure which is independent of the magnitude of the pressure $p_0$ of the feed-pump.

Fig. 6 represents the device controlled by depression. The delivery pipe 20 of the feed-pump 19 is tapped with a branch 21, containing a calibrated duct 27 feeding the control pipe 15a. A by-pass 25 provided with a valve 26 is tapped at 23 on this pipe. Further, a pipe 29 provided with a calibrated duct 28 gives rise to a constant leakage from the control pipe 15a to the intake pipe of the feed-pump 19.

Under these conditions, when the control valve 26 is closed, the calibrated duct 27 gives rise, in the control pipe 15a, to a duct-loss—$d_{p1}$ relatively to the feed-pipe 11a, the magnitude of this duct-loss depending on the flow in the leakage circuit 28—29. By opening the valve 26, pipes 11a and 15a are directly connected, thus reducing—$d_{p1}$ until it cancels. The valve 26 therefore adjusts the relative depression between 15a and 11a, and hence the lift of needle 1. It is noted, in the case of control by depression, that the lift of the needle depends on the magnitude of the depression, but in the example shown, the latter being caused by a duct-loss, is proportional to the pressure $p_0$ of the feed-pump.

In Fig. 7, a further valve 30 is shown controlling an additional by-pass 31 between pipes 11 and 15 connected to the same feed device 35. Such a by-pass is located in each blade 33 of the rotor, for instance near the hub. This valve is normally closed. It may however be remote-controlled mechanically, electrically or by any other appropriate means, and in a cyclic way at each turn of the rotor. The valve 30 is actuated by a coil 43 one end of which is grounded at 44 and the other end of which is connected to a source of current 50, through a slip ring 46. The latter comprises a conducting portion and an insulating portion, the source of current 50 being connected to this slip ring through a brush 49. When this brush comes into contact with the conducting portion of the ring, the coil 43 is energized and the valve 50 operates; thus, the pressure in the pipes 11 and 15 is equalized. By lowering or cancelling the relative overpressure or depression between pipes 15 and 11, the opening of this valve decreases the lift of the needle 1 or shuts it completely; it is thus possible to decrease or cancel at every turn, the feeding of the engine of a blade when the latter crosses a certain azimuth or rather a predetermined azimuth sector relatively to the propulsion direction of the helicopter. This enables to effect practically the cyclical feeding of helicopter rotors propelled by reaction-jet engines, such a feeding being convenient owing to the cyclical propelling efficiency of these engines; the principle of this feeding is described in my U. S. A. application for patent, Ser. No. 765,467, filed on 1st August 1947.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In a rotary machine having a rotor driven by at least one engine located at the peripheral part of said rotor and acting in a substantial tangential direction, a fuel supply device comprising the combination of at least two substantially radial pipes extending from the central part of said rotor to the peripheral part thereof, in the vicinity of said engine, means for supplying liquid fuel under pressure to said pipes through the central ends thereof, means for adjusting liquid pressure in at least one of said pipes, connecting means between said engine and the peripheral end of at least one of said pipes, valve means on said connecting means for adjusting the fuel flow therethrough, and means, at the peripheral ends of said pipes, responsive to the differential pressure of said pipes, for controlling said valve means.

2. In a rotary machine having a rotor freely rotating about a hub and driven by at least one engine located at the peripheral part of said rotor and acting in a substantial tangential direction, a fuel supply device comprising the combination of at least two substantially radial pipes extending from the central part of said rotor to the peripheral part thereof, in the vicinity of said engine, sealing joints fast in rotation with said rotor and respectively connected to each of said pipes at the central end thereof, ducts through said hub, respectively connected to each of said sealing joints, means for supplying liquid fuel under pressure to said ducts, means for adjusting liquid pressure in at least one of said ducts, connecting means between said engine and the peripheral end of at least one of said pipes, valve means on said connecting means for adjusting the fuel flow therethrough, and means, at the peripheral ends of said pipes, responsive to the differential pressure of said pipes, for controlling said valve means.

3. In a rotary machine having a rotor driven by at least one engine located at the peripheral part of said rotor and acting in a substantial tangential direction, a fuel supply device comprising the combination of at least two substantially radial pipes extending from the central part of said rotor to the peripheral part thereof, in the vicinity of said engine, means for supplying liquid fuel under pressure to said pipes through the central ends thereof, means for adjusting liquid pressure in at least one of said pipes, connecting means between said engine and the peripheral end of at least one of said pipes, valve means on said connecting means for adjusting the fuel flow therethrough, an enclosure divided into two chambers by a liquid tight displaceable partition, said chambers being respectively connected to said pipes, at the peripheral ends thereof, and a mechanical link between said partition and said valve means, whereby the latter is controlled by the differential pressure of said pipes.

4. In a rotary machine having a rotor driven by at least one engine located at the peripheral part of said rotor and acting in a substantial tangential direction, a fuel supply device comprising the combination of at least two substantially radial pipes extending from the central part of said rotor to the peripheral part thereof, in the vicinity of said engine, means for supplying liquid fuel under pressure to said pipes through the central ends thereof, means for adjusting liquid pressure in at least one of said pipes, a substantially cylindrical enclosure, radially arranged in the vicinity of said engine, including three chambers in consecutive radial disposition, the innermost chamber being separated from the intermediate chamber by a liquid-tight displaceable partition, the intermediate chamber being separated from the outermost chamber by a stationary substantially liquid-tight partition, said innermost and outermost chamber being connected to one of said pipes, and said intermediate chamber being connected to the other of said pipes, duct means between said outermost chamber and said engine, and a needle valve adapted to adjust the passage cross-section of said duct means and extending through said outermost chamber, said stationary partition and said intermediate chamber, said needle valve being secured to said displaceable partition, whereby it is controlled by the differential pressure of said pipes.

5. In a rotary machine having a rotor driven by at least one engine located at the peripheral part of said rotor and acting in a substantial tangential direction, a fuel supply device comprising the combination of at least two substantially radial pipes extending from the central part of said rotor to the peripheral part thereof, in the vicinity of said engine, means for supplying liquid fuel under pressure to said pipes through the central ends thereof, means for adjusting liquid pressure in at least one of said pipes, a substantially cylindrical enclosure, radially arranged in the vicinity of said engine, including three chambers in consecutive radial disposition, the innermost chamber being separated from the intermediate chamber by a liquid-tight displaceable partition, the intermediate chamber being separated from the outermost chamber by a stationary perforated partition, said innermost chamber being connected to one of said pipes and said outermost chamber being connected to the other of said pipes, duct means between said outermost chamber and said engine, and a needle valve adapted to adjust the passage cross-section of said duct means and extending through said outermost chamber, said stationary partition and said intermediate chamber, said needle valve being secured to said displaceable partition, whereby it is controlled by the differential pressure of said pipes.

6. In a rotary machine having a rotor freely rotating about a hub and driven by at least one engine located at the peripheral part of said rotor and acting in a substantial tangential direction, a fuel supply device comprising the combination of at least two substantially radial pipes extending from the central part of said rotor to the peripheral part thereof, in the vicinity of said engine, sealing joints fast in rotation with said rotor and respectively connected to each of said pipes at the central end thereof, ducts through said hub, respectively connected to each of said sealing joints, means for supplying liquid fuel under pressure to said ducts, means on one of said ducts for supplying constant additional pressure thereto, a by-pass across said latter means, means for adjusting the passage cross-section of said by-pass, connecting means between said engine and the peripheral end of at least one of said pipes, valve means on said connecting means for adjusting the fuel flow therethrough, and means, at the peripheral ends of said pipes, responsive to the differential pressure of said pipes, for controlling said valve means.

7. In a rotary machine having a rotor freely rotating about a hub and driven by at least one engine located at the peripheral part of said rotor and acting in a substantial tangential direction, a fuel supply device comprising the combination of at least two substantially radial pipes extending from the central part of said rotor to the peripheral part thereof, in the vicinity of said engine, sealing joints fast in rotation with said rotor and respectively connected to each of said pipes at the central end thereof, ducts through said hub, respectively connected to each of said sealing joints, means for supplying liquid fuel under pressure to said ducts, means on one of said ducts for supplying constant additional pressure thereto, piping means located down-stream with respect to said last-mentioned pressure supply means for connecting said ducts to one another, means for adjusting the passage cross-section of said piping means, connecting means between said engine and the peripheral end of at least one of said pipes, valve means on said connecting means for adjusting the fuel flow therethrough, and means, at the peripheral ends of said pipes, responsive to the differential pressure of said pipes, for controlling said valve means.

8. In a rotary machine having a rotor freely rotating about a hub and driven by at least one engine located at the peripheral part of said rotor and acting in a substantial tangential direction, a fuel supply device comprising the combination of at least two substantially radial pipes extending from the central part of said rotor to the peripheral part thereof, in the vicinity of said engine, sealing joints fast in rotation with said rotor and respectively connected to each of said pipes at the central end thereof, ducts through said hub, respectively connected to each of said sealing joints, means for supplying liquid fuel under pressure to said ducts, a by-pass across said last-mentioned supply means adapted to cause a drop in pressure to liquid flowing therethrough, piping means located down-stream with respect to said supply means and the by-pass thereof, for connecting said ducts to one another, means for adjusting the passage cross-section of said piping means, connecting means between said engine and the peripheral end of at least one of said pipes, valve means on said connecting means for adjusting the fuel flow therethrough and means, at the peripheral ends of said pipes, responsive to the differential pressure of said pipes, for controlling said valve means.

9. In a rotary machine having a rotor freely rotating about a hub and driven by at least one engine located at the peripheral part of said rotor and acting in a substantial tangential direction, a fuel supply device comprising the combination of at least two substantially radial pipes extending from the central part of said rotor to the peripheral part thereof, in the vicinity of said engine, sealing joints fast in rotation with said rotor and respectively connected to each of said pipes at the central end thereof, ducts through said hub, respectively connected to each of said sealing joints, means for supplying liquid fuel under pressure to said ducts, means for adjusting liquid pressure in at least one of said ducts, connecting means between said engine and the peripheral end of at least one of said pipes, valve means on said connecting means for adjusting the fuel flow therethrough, and means, at the peripheral ends of said pipes, responsive to the differential pressure of said pipes, for controlling said valve means, piping means located upstream with respect to said last-mentioned differential pressure responsive means for connecting said pipes to one another, electromechanically actuated gating means for obturating said piping means, and means for intermittently energizing said gating means according to the angular position of said rotor relatively to said hub, whereby the pressure in said pipes is equalized when said gating means are energized.

10. A fuel supply system for a reaction motor mounted on a rotor powered by said motor and comprising a fuel pump having an adjustable output pressure, a first fuel line interconnecting said motor and said pump, said first fuel line extending radially outward along said rotor so that due to rotation of said rotor the fuel pressure therein is affected by both the fuel pump pressure and the centrifugal force acting on the fuel therein, a second fuel line extending radially outward along said rotor so that the fuel pressure therein is affected by the centrifugal force acting on the fuel therein, a fuel pressure responsive valve interposed in said first fuel line at substantially the same position as said motor for regulating the pressure between said pump and said motor, said valve having inlet and outlet connections and a fuel flow governing piece for regulating the flow between said connections, said fuel flow governing piece being responsive to the fuel pressure in said first and second fuel lines and so positioned with respect to the incoming fuel that the centrifugal force of the fuel in said second fuel line opposes the centrifugal force of the fuel in said first fuel line.

PAUL MORAIN.

REFERENCES CITED

The following references are of record in the file of this patent:

UNITED STATES PATENTS

| Number | Name | Date |
| --- | --- | --- |
| 1,021,521 | Héroult | Mar. 26, 1912 |
| 1,699,676 | Rush | Jan. 22, 1929 |
| 2,224,472 | Chandler | Dec. 10, 1940 |
| 2,446,266 | Cummings | Aug. 3, 1948 |
| 2,446,523 | Bradbury | Aug. 10, 1948 |
| 2,456,603 | Barford | Dec. 14, 1948 |
| 2,457,936 | Stalker | Jan. 4, 1949 |
| 2,465,856 | Emigh | Mar. 29, 1949 |
| 2,508,260 | Holley | May 16, 1950 |